United States Patent
Caffrey

(10) Patent No.: US 10,664,765 B2
(45) Date of Patent: May 26, 2020

(54) LABELLING INTERVALS USING SYSTEM DATA TO IDENTIFY UNUSUAL ACTIVITY IN INFORMATION TECHNOLOGY SYSTEMS

(71) Applicant: INTERNATIONAL BUSINESS MACHINES CORPORATION, Armonk, NY (US)

(72) Inventor: James M. Caffrey, Woodstock, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 737 days.

(21) Appl. No.: 15/242,631

(22) Filed: Aug. 22, 2016

(65) Prior Publication Data
US 2018/0053117 A1    Feb. 22, 2018

(51) Int. Cl.
*G06N 20/00* (2019.01)
*H04L 12/24* (2006.01)
*G06F 11/00* (2006.01)

(52) U.S. Cl.
CPC .......... *G06N 20/00* (2019.01); *G06F 11/00* (2013.01); *H04L 41/069* (2013.01); *H04L 41/0622* (2013.01); *H04L 41/16* (2013.01)

(58) Field of Classification Search
CPC . H04L 41/0622; H04L 41/069; H04L 41/142; H04L 41/16; G06F 11/00; G06F 11/008; G06F 11/0781; G06F 11/0772; G06F 11/0778; G06F 11/3055; G06F 11/3438; G06F 17/40; G06F 21/554; G06N 20/00; G06N 5/02; G06N 99/005
See application file for complete search history.

(56) References Cited

U.S. PATENT DOCUMENTS

2005/0038827 A1* 2/2005 Hooks ................ G06F 11/0748
2006/0248407 A1* 11/2006 Adams, Jr. .......... H04L 41/0253
714/43

(Continued)

OTHER PUBLICATIONS

Munz et al., "Traffic Anomaly Detection Using K-Means Clustering", 2007, ITG Workshop MMBnet, pp. 1-8 (Year: 2007).*

*Primary Examiner* — Hal Schnee
*Assistant Examiner* — Brent Johnston Hoover
(74) *Attorney, Agent, or Firm* — Cantor Colburn LLP; William Kinnaman

(57) ABSTRACT

Embodiments include identifying unusual activity in an IT system based on user configurable message anomaly scoring. Aspects include receiving a message stream for the IT system and dividing the message stream into a plurality of intervals, wherein each interval corresponds to a time period. Aspects also include identifying and removing one or more intervals from the plurality of intervals that include a startup or a shutdown of an element of the IT system, identifying and removing one or more intervals from the plurality of intervals that correspond to a standard level of command activity and an elevated level of user complaint activity, and identifying and removing one or more intervals from the plurality of intervals that correspond to an elevated level of command activity and an standard level of user complaint activity. Aspects further include creating a training set of intervals that consists of the remaining labelled intervals.

17 Claims, 4 Drawing Sheets

(56) References Cited

U.S. PATENT DOCUMENTS

| | | |
|---|---|---|
| 2013/0111588 A1 | 5/2013 | Agrawal et al. |
| 2014/0180738 A1* | 6/2014 | Phillipps ............ G06Q 10/0631 |
| | | 705/7.12 |
| 2015/0332488 A1 | 11/2015 | Beck et al. |

* cited by examiner

LABELLING INTERVALS USING SYSTEM DATA TO IDENTIFY UNUSUAL ACTIVITY IN INFORMATION TECHNOLOGY SYSTEMS

BACKGROUND

The present disclosure relates to information technology (IT) systems, and more specifically, to methods, systems and computer program products for identifying unusual activity in information technology systems.

Today's complex IT systems, such as integrated data centers, require a team of experts to monitor various system messages for abnormal behavior, and to diagnose and fix anomalies before they result in systems failures and outages. These tasks are costly and difficult for many reasons, including the fact that a variety of everyday changes can cause system anomalies in the operation of the IT system. In typical complex IT systems, the number of status messages created by the components of the IT system far exceed what can reasonably be read and analyzed by the team of IT experts. As a result, automated systems have been developed for reviewing and filtering these status messages.

Currently available automated systems for reviewing status messages are configured by a domain expert that reviews a log of status messages that are grouped into time intervals. The interval data is then analyzed to build a statistical model that evaluates real-time status messages for potential anomalies in the IT system. In some cases, the domain expert manually determines which time intervals should be used in building the statistical model, this manual selection process is both error prone and expensive. In other cases, the statistical model is created based on the data from all of the time intervals.

These automated systems need to be extended to identify not only unusual intervals but intervals which need immediate attention. To do apply classic statistical methods like random forest or logistic regression to identify the intervals which need immediate attention requires an automated method to label the intervals that need attention. The current methods require that the domain expert label those intervals which is both costly and error prone.

SUMMARY

In accordance with an embodiment, a method for identifying unusual activity in an information technology (IT) system is provided. The method includes receiving, by a processing device, a message stream for the IT system and dividing the message stream into a plurality of intervals, wherein each interval corresponds to a time period. The method also includes identifying and removing one or more intervals from the plurality of intervals that include a startup or a shutdown of an element of the IT system, identifying and removing one or more intervals from the plurality of intervals that correspond to a standard level of command activity and an elevated level of user complaint activity, and identifying and removing one or more intervals from the plurality of intervals that correspond to an elevated level of command activity and an standard level of user complaint activity. The method further includes creating a training set of intervals that consists of the remaining labelled intervals.

In accordance with another embodiment, a system for identifying unusual activity in an information technology (IT) system includes a processor in communication with one or more types of memory. The processor is configured to receive a message stream for the IT system and divide the message stream into a plurality of intervals, wherein each interval corresponds to a time period. The processor is also configured to identify and remove one or more intervals from the plurality of intervals that include a startup or a shutdown of an element of the IT system, identify and remove one or more intervals from the plurality of intervals that correspond to a standard level of command activity and an elevated level of user complaint activity, and identify and remove one or more intervals from the plurality of intervals that correspond to an elevated level of command activity and an standard level of user complaint activity. The processor is further configured to create a training set of intervals that consists of the remaining labelled intervals.

In accordance with a further embodiment, a computer program product for identifying unusual activity in an information technology (IT) system includes a non-transitory storage medium readable by a processing circuit and storing instructions for execution by the processing circuit for performing a method. The method includes receiving, by a processing device, a message stream for the IT system and dividing the message stream into a plurality of intervals, wherein each interval corresponds to a time period. The method also includes identifying and removing one or more intervals from the plurality of intervals that include a startup or a shutdown of an element of the IT system, identifying and removing one or more intervals from the plurality of intervals that correspond to a standard level of command activity and an elevated level of user complaint activity, and identifying and removing one or more intervals from the plurality of intervals that correspond to an elevated level of command activity and an standard level of user complaint activity. The method further includes creating a training set of intervals that consists of the remaining plurality of labelled intervals.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for identifying unusual activity in an information technology (IT) system are provided. In exemplary embodiments, a historical set of IT messages for an IT system is received and divided into time intervals. Each of the intervals is then automatically categorized based on IT system data that is received from multiple sources. The multiple sources can include, but are not limited to, a help desk activity log, social media postings, an IT system maintenance log, and IT command activity. Intervals that are categorized as corresponding to time periods of unusual IT system activity and intervals that are categorized as corresponding to time periods of normal IT system activity are used to create a training set of intervals. Notably, time intervals that cannot be categorized into one of these two categories are not included in the training set of intervals. In exemplary embodiments, the training set of intervals is utilized by a machine learning algorithm to create an anomaly detection model. As new incoming messages are received, they are grouped into intervals and the interval data is analyzed based on the anomaly detection model to determine if an anomaly alert should be created.

Figure 1:
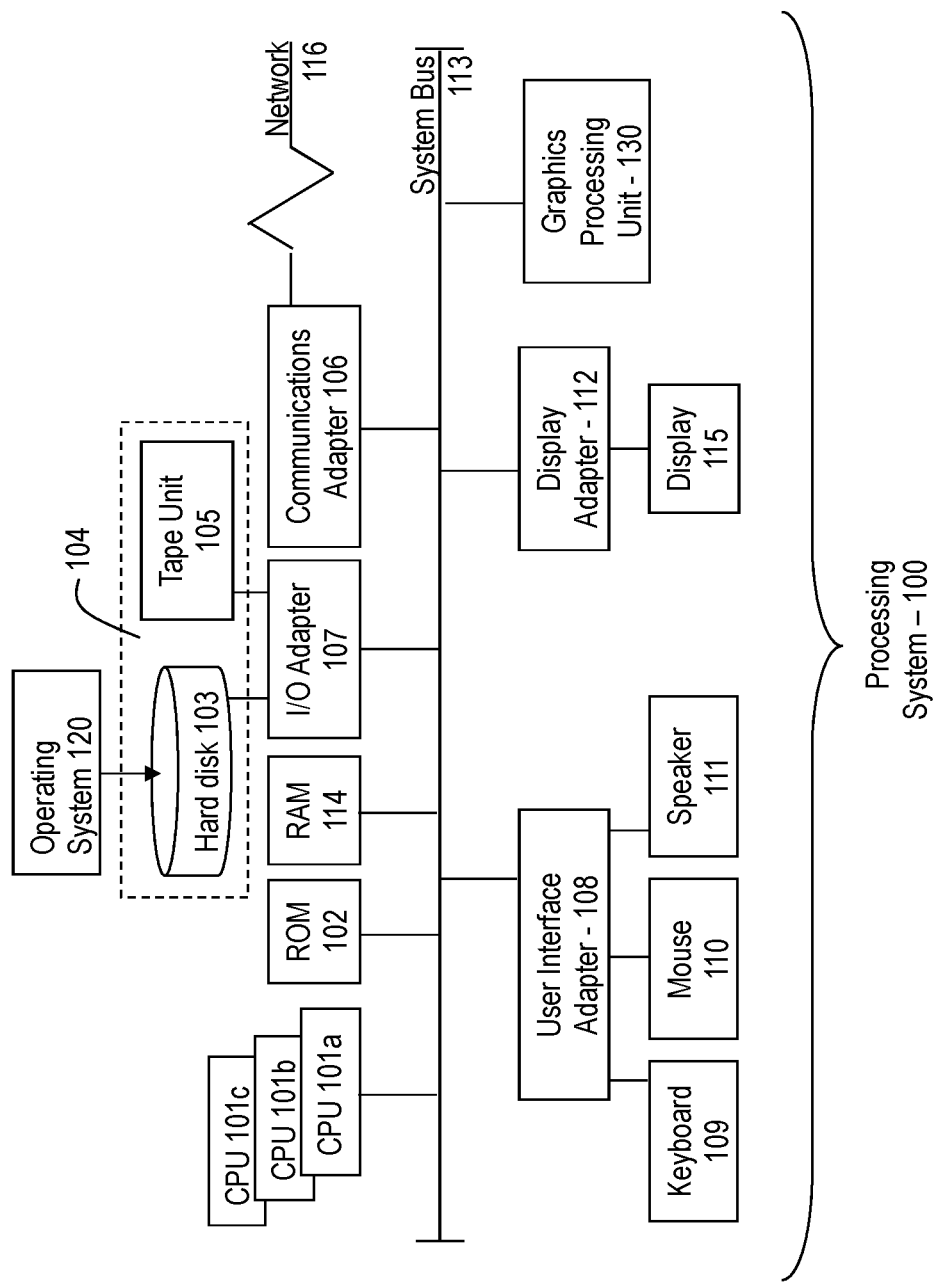
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
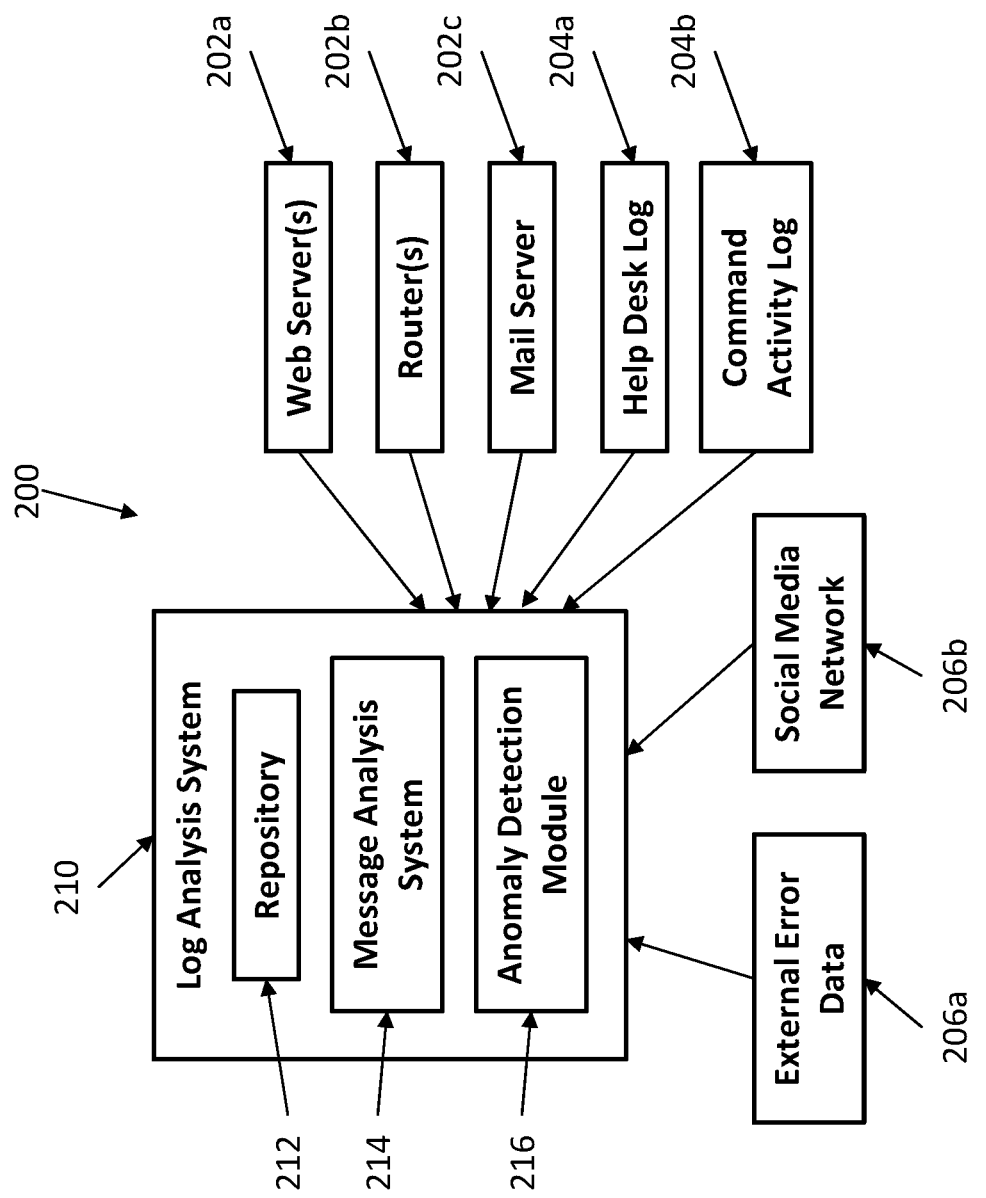
FIG. 2 is a block diagram illustrating an information technology system in accordance with an exemplary embodiment.

Referring now to FIG. 2, an information technology (IT) system 200 in accordance with an embodiment is illustrated. As illustrated, the IT system 200 includes a plurality of pieces of IT equipment 202 that can include, but are not limited to, a web server 202a, a router 202b, and a mail server 202c. The IT system 200 also includes a log analysis system 210, which may be a processing system similar to the one shown in FIG. 1. The log analysis system 210 includes a repository 212 for storing status messages received from the plurality of pieces of IT equipment 202. In exemplary embodiments, the pieces of IT equipment 202 generate status messages during their operation and transmit these status messages to the log analysis system 210. The log analysis system 210 receives the status messages from the plurality of pieces of IT equipment 202 and stores them in the repository 212.

The log analysis system 210 performs an analysis on the stored status messages to identify potential problems in the IT system 200. In one embodiment, the log analysis system 210 includes a message analysis system 214 that analyzes each status message and assigns a message anomaly score to the message based on a set of rules or from a detailed statistical analysis of the historical message behavior. In another embodiment, the log analysis system 210 receives status messages that include a message anomaly score that was assigned by a piece of IT equipment that generated the status message. In exemplary embodiments, the log analysis system 210 receives status messages and stores the messages in the repository 212 along with the message anomaly score for each message.

The log analysis system 210 also includes an anomaly detection module 216 that creates an anomaly detection model based on a training set of messages selected from the repository 212. In exemplary embodiment, the training set of messages is selected based on a combination of a level of command activity in the IT system and based on a level of user complaint activity for the IT system. The level of command activity in the IT system can be determined based on command activity log 204b and the level of user complaint activity can be determined based on one or more of a help desk log 204a and a social media network 206b. In exemplary embodiments, the training set of messages can also be selected based on external error data 206a, which may include scheduled maintenance information or other data regarding known service disruptions in the IT system.

Figure 3:
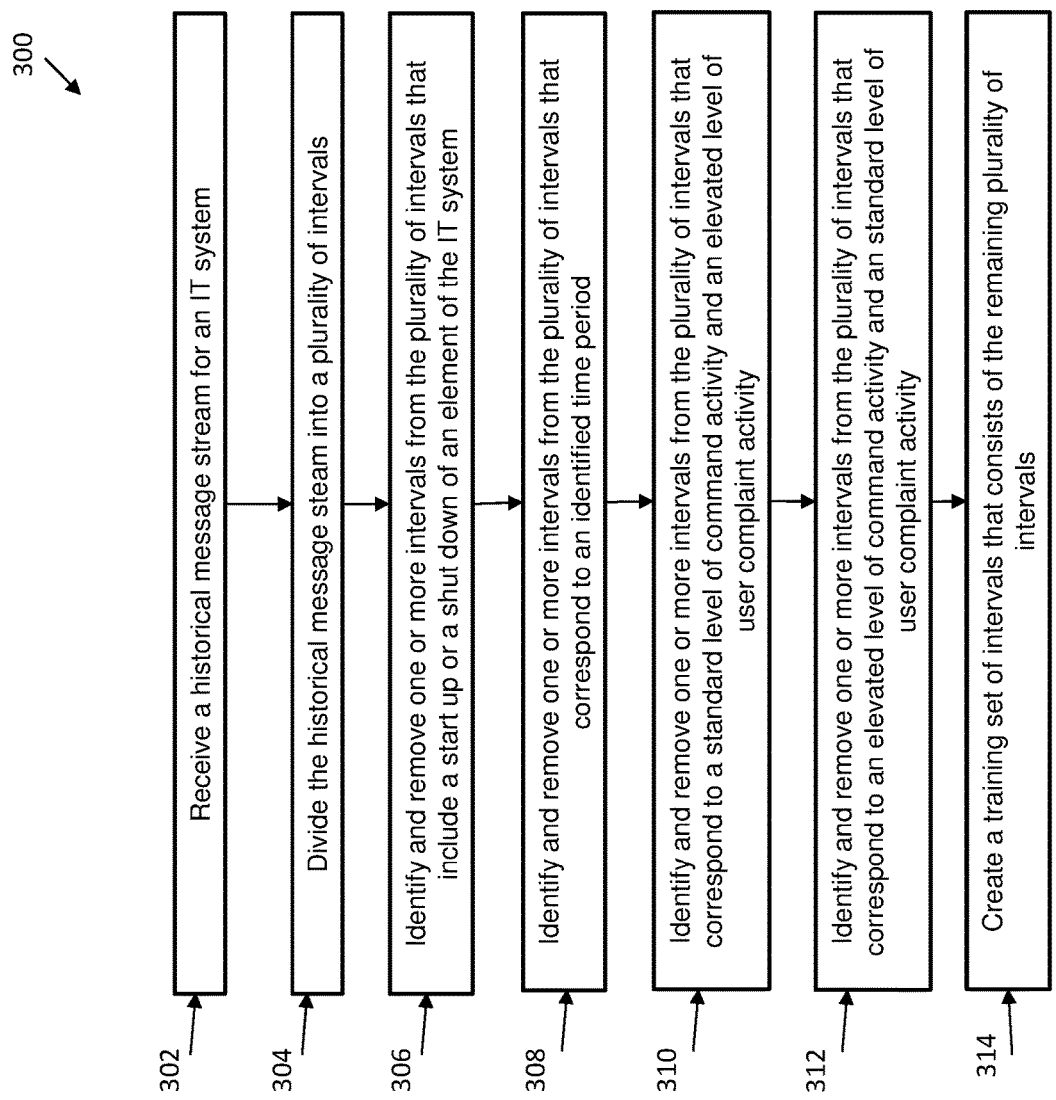
FIG. 3 is a flow diagram of a method for selecting intervals for use in an anomaly analysis system in accordance with an exemplary embodiment.

Referring now to FIG. 3, a flow diagram of a method 300 for selecting intervals for use in an anomaly analysis system in accordance with an exemplary embodiment is shown. As shown at block 302, the method 300 includes receiving a historical message stream for an IT system. Next, as shown at block 304, the method 300 includes dividing the message stream into a plurality of intervals. In exemplary embodiments, each of the intervals corresponds to a fixed time period, i.e., five minutes, ten minutes, fifteen minutes, etc. The method 300 also includes identifying and removing one or more intervals from the plurality of intervals that include a startup or a shutdown event for an element of the IT system, as shown at block 306. Since the startup or shutdown of an element of the IT system, such as a piece of hardware or software, will likely cause disruptions in the IT system, the message data from these intervals is removed from the data set used to create the anomaly detection model.

In exemplary embodiments, there are multiple existing ways to identify a startup and a shutdown event. For example, one way to identify shutdown and startup event is to use the absence of a connection to an external monitor to indicate that a shutdown and restart has occurred. In general, intervals that include startup and shutdown events will include significantly more message traffic than intervals that include normal operation of the IT system. In exemplary embodiments, identifying intervals as including startup and shutdown events can be performed by determining the average number of messages during an interval and comparing the average number of messages to the number of messages in each interval. In exemplary embodiments, all of the intervals from the start of a connection until the number of messages during the interval returns to the determined average can be identified as startup intervals. In exemplary embodiments, all of the intervals from the end of the connection moving back in time until the number of message during the interval returns to average can be identified as shutdown intervals.

Next, as shown at block 308, the method 300 includes identifying and removing one or more intervals from the plurality of intervals that correspond to an identified time period. In exemplary embodiments, the identified time period can correspond to a period of scheduled maintenance of the IT system. Since scheduled maintenance of the IT system will likely cause disruptions in the IT system, the message data from these intervals is removed from the data set used to create the anomaly detection model.

Continuing with reference to FIG. 3, as shown at block 310, the method 300 includes identifying and removing one or more intervals from the plurality of intervals that correspond to a standard level of command activity and an elevated level of user complaint activity. In exemplary embodiments, the user complaint activity includes one or more or a help desk activity level and a social media complaint activity and the command activity includes one or more diagnostic commands being executed by a maintainer of the IT system. The method 300 also includes identifying and removing one or more intervals from the plurality of intervals that correspond to an elevated level of command activity and a standard level of user complaint activity, as shown at block 312. Next, as shown at block 314, the method 300 includes creating a training set of intervals that consists of the remaining plurality of intervals.

In exemplary embodiments, the remaining plurality of intervals include intervals that have a combination of an elevated level of command activity and an elevated level of user complaint activity, which are intervals that are likely associated with anomalies in the operation of the IT system. In addition, the remaining plurality of intervals include intervals that have a combination of a standard level of command activity and a standard level of user complaint activity, which are intervals that are likely associated with normal operation of the IT system. In exemplary embodiments, intervals with an indeterminate status, i.e., intervals in which only one of the user complaint activity or command activity are elevated, are removed from the intervals included in the training set. In exemplary embodiments, the removal of intervals that have an indeterminate status from the data set used to create the anomaly detection model simplifies the creation of the anomaly detection model by reducing the number of intervals that are analyzed to create the anomaly detection model.

Identifying unexpected diagnostic activity, also referred to as an elevated level of command activity, in the IT system can be performed in a variety of methods. Many enterprise IT solutions include routine diagnostic activity that is performed to check the system to make sure there is no incipient problem and to capture base line information for use to diagnose problems. Diagnostic activity that is not routine indicates that the individuals maintaining the system are actively checking that system for a problem.

One method of identifying unusual diagnostic activity is to separate commands and command responses, i.e., command activity, from normal message traffic and to analyze historical command activity against current command activity to identify unusual command activity. In one embodiment, the analysis can include the use of a periodicity scorer that eliminates commands issued periodically to look for incipient problems and to establish a base line. In another embodiment, the analysis can include the use of a rarity scorer to increase the interval score when rare commands are issued during an interval. In a further embodiment, the analysis can include a log scorer that increases the interval score when unexpected high numbers of a specific command are issued during an interval.

In exemplary embodiments, the method 300 can also include identifying and removing messages from each of the plurality of intervals that correspond to a message type that is identified as excluded. For example, the maintainer of an IT system may identify one or more message types that can be ignored when creating the anomaly detection model and may opt for these types of messages to be removed from all intervals prior to the creation of the anomaly detection model.

Figure 4:
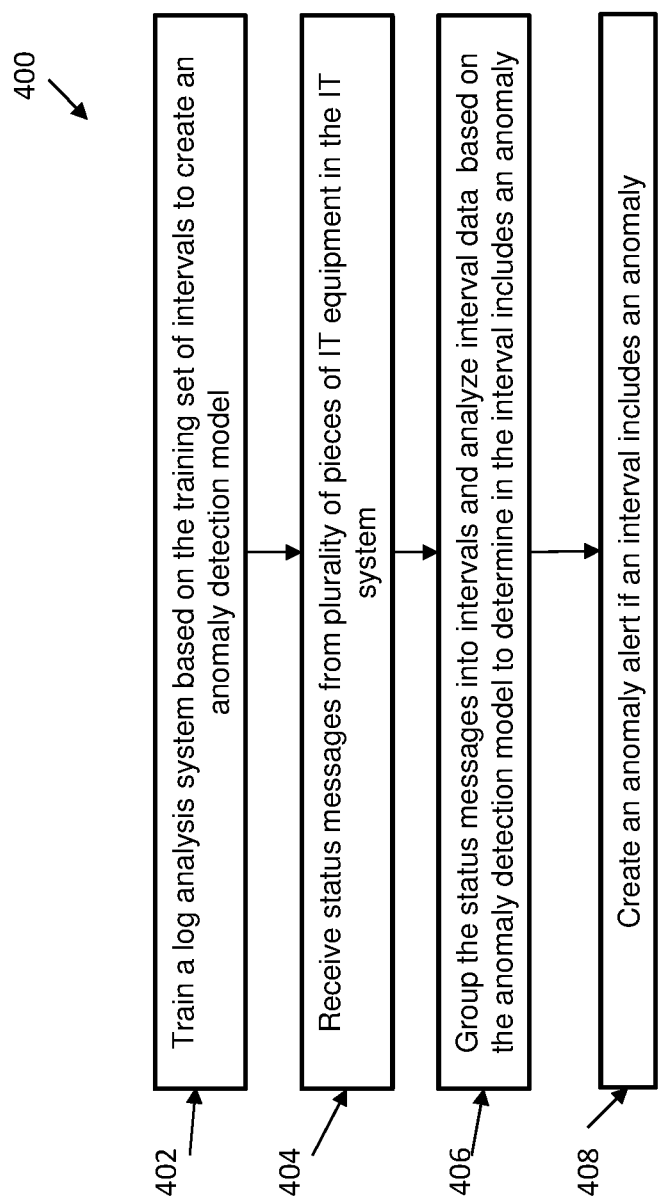
FIG. 4 is a flow diagram of a method for identifying unusual intervals in an IT system in accordance with an exemplary embodiment.

Referring now to FIG. 4, a flow chart diagram of a method for identifying unusual intervals in an IT system in accordance with an exemplary embodiment is shown. As shown at block 402, the method 400 includes training a log analysis system based on the training set of intervals, which was created by the method shown in FIG. 3, to create an anomaly detection model. In exemplary embodiments, training a log analysis system based on the training set of intervals for the IT system includes training a message anomaly scoring system, as shown in FIG. 2. Next, shown at block 404, the method 400 includes receiving, by the log analysis system, status messages from a plurality of pieces of IT equipment in the IT system. In exemplary embodiments, the IT messages may include, or may be assigned by the log analysis system, a message anomaly score. The method 400 also includes grouping the status messages into an interval and analyzing the interval data based on the anomaly detection model to determine if the interval includes an anomaly, as shown at block 406. Next, as shown at block 408, the method 400 includes creating an anomaly alert if an interval includes an anomaly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identifying unusual activity in an information technology (IT) system, the method comprising:
    receiving, by a processing device, a message stream for the IT system;
    dividing the message stream into a plurality of intervals, wherein each interval corresponds to a time period;
    determining a level of user complaint activity associated with each of the plurality of intervals based on one or more of a help desk activity log and a social media complaint activity;
    identifying and removing one or more intervals from the plurality of intervals that include a startup or a shutdown of an element of the IT system;
    identifying and removing one or more intervals from the plurality of intervals that correspond to a standard level of command activity and an elevated level of user complaint activity;

identifying and removing one or more intervals from the plurality of intervals that correspond to an elevated level of command activity and a standard level of user complaint activity; and
creating a labeled training set of intervals that consists of the remaining plurality of intervals to support supervised learning.

2. The method of claim 1, further comprising identifying and removing one or more intervals from the plurality of intervals that correspond to an identified time period.

3. The method of claim 2, wherein the identified time period corresponds to a period of scheduled maintenance of the IT system.

4. The method of claim 1, further comprising:
training a log analysis system based on the training set of intervals to create an anomaly detection model;
receiving status messages from a plurality of pieces of IT equipment in the IT system;
grouping the status messages into intervals and analyzing interval data based on the anomaly detection model to determine whether the interval includes an anomaly; and
creating an anomaly alert if the interval includes an anomaly.

5. The method of claim 1 wherein the command activity includes one or more diagnostic commands being executed by a maintainer of the IT system.

6. The method of claim 1, further comprising identifying and removing messages from each of the plurality of intervals that correspond to a message type that is identified as excluded.

7. A computer program product for identifying unusual activity in an IT system, the computer program product comprising:
a non-transitory storage medium readable by a processing circuit and storing instructions for execution by the processing circuit for performing a method comprising:
receiving, by a processing device, a message stream for the IT system;
dividing the message stream into a plurality of intervals, wherein each interval corresponds to a time period;
determining a level of user complaint activity associated with each of the plurality of intervals based on one or more of a help desk activity log and a social media complaint activity;
identifying and removing one or more intervals from the plurality of intervals that include a startup or a shutdown of an element of the IT system;
identifying and removing one or more intervals from the plurality of intervals that correspond to a standard level of command activity and an elevated level of user complaint activity;
identifying and removing one or more intervals from the plurality of intervals that correspond to an elevated level of command activity and a standard level of user complaint activity; and
creating a labeled training set of intervals that consists of the remaining plurality of intervals to support supervised learning.

8. The computer program product of claim 7, wherein the method further comprises identifying and removing one or more intervals from the plurality of intervals that correspond to an identified time period.

9. The computer program product of claim 8, wherein the identified time period corresponds to a period of scheduled maintenance of the IT system.

10. The computer program product of claim 7, wherein the method further comprises:
training a log analysis system based on the training set of intervals to create an anomaly detection model;
receiving status messages from a plurality of pieces of IT equipment in the IT system;
grouping the status messages into intervals and analyzing interval data based on the anomaly detection model to determine whether the interval includes an anomaly; and
creating an anomaly alert if the interval includes an anomaly.

11. The computer program product of claim 7 wherein the command activity includes one or more diagnostic commands being executed by a maintainer of the IT system.

12. The computer program product of claim 7, wherein the method further comprises identifying and removing messages from each of the plurality of intervals that correspond to a message type that is identified as excluded.

13. A system for identifying unusual activity in an information technology (IT) system, comprising:
a processor in communication with one or more types of memory, the processor configured to:
receive, by a processing device, a message stream for the IT system;
divide the message stream into a plurality of intervals, wherein each interval corresponds to a time period;
determine a level of user complaint activity associated with each of the plurality of intervals based on one or more of a help desk activity log and a social media complaint activity;
identify and remove one or more intervals from the plurality of intervals that include a startup or a shutdown of an element of the IT system;
identify and remove one or more intervals from the plurality of intervals that correspond to a standard level of command activity and an elevated level of user complaint activity;
identify and remove one or more intervals from the plurality of intervals that correspond to an elevated level of command activity and a standard level of user complaint activity; and
create a labeled training set of intervals that consists of the remaining plurality of intervals to support supervised learning.

14. The system of claim 13, wherein the processor is further configured to identify and remove one or more intervals from the plurality of intervals that correspond to an identified time period.

15. The system of claim 14, wherein the identified time period corresponds to a period of scheduled maintenance of the IT system.

16. The system of claim 13, wherein the processor is further configured to:
train a log analysis system based on the training set of intervals to create an anomaly detection model;
receive status messages from a plurality of pieces of IT equipment in the IT system;
group the status messages into intervals and analyze interval data based on the anomaly detection model to determine whether the interval includes an anomaly; and
create an anomaly alert if the interval includes an anomaly.

17. The system of claim 13 wherein the command activity includes one or more diagnostic commands being executed by a maintainer of the IT system.

* * * * *